United States Patent
Chiang et al.

(10) Patent No.: US 11,551,289 B2
(45) Date of Patent: Jan. 10, 2023

(54) INTELLIGENT STORE SYSTEM AND INTELLIGENT STORE METHOD

(71) Applicant: Industrial Technology Research Institute, Hsinchu (TW)

(72) Inventors: Chi-Chou Chiang, Chiayi (TW); Hsin-Chien Huang, Hsinchu (TW); Wen Tsui, Hsinchu County (TW); Yu Cho, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 39 days.

(21) Appl. No.: 17/120,284

(22) Filed: Dec. 14, 2020

(65) Prior Publication Data
US 2022/0138838 A1 May 5, 2022

(30) Foreign Application Priority Data
Nov. 3, 2020 (TW) ................................ 109138164

(51) Int. Cl.
*G06Q 30/06* (2012.01)
(52) U.S. Cl.
CPC ..... *G06Q 30/0643* (2013.01); *G06Q 30/0635* (2013.01); *G06Q 30/0639* (2013.01)
(58) Field of Classification Search
CPC ........... G06Q 30/0635; G06Q 30/0643; G06Q 30/0639

(Continued)

(56) References Cited

U.S. PATENT DOCUMENTS 8,239,287 B1 * 8/2012 Smith ................ G06Q 30/0241
705/26.7
10,046,229 B2 8/2018 Tran et al.
(Continued)

FOREIGN PATENT DOCUMENTS

CN 106064734 11/2016
CN 108597153 9/2018
(Continued)

OTHER PUBLICATIONS

Inside Amazon's surveillance-powered, no checkout convenience store, Devin Coldewey, Jan. 21, 2018 (Year: 2018).*
(Continued)

*Primary Examiner* — Ming Shui
(74) *Attorney, Agent, or Firm* — JCIPRNET

(57) ABSTRACT

An intelligent store system and an intelligent store method are provided. The method includes: sensing, by a proximity sensor, whether there is a first customer approaching the proximity sensor; sensing, by an image sensor, a movement trajectory of the first customer; and determining whether the first customer is entering or leaving a store in response to the first customer approaching the proximity sensor sensed by the proximity sensor. If the first customer is entering the store, a first virtual identity and a first virtual shopping cart corresponding to the first virtual identity are generated for the first customer, and a first product list of the first virtual shopping cart is updated according to the movement trajectory. If the first customer is leaving the store, a first operation of the first customer is received by a human machine interface, and the first product list according to the first operation is updated.

12 Claims, 4 Drawing Sheets

(58) Field of Classification Search
USPC .................................................... 705/27.2
See application file for complete search history.

(56) References Cited

U.S. PATENT DOCUMENTS

| | | | |
|---|---|---|---|
| 10,140,820 B1 | 11/2018 | Zalewski et al. | |
| 10,176,456 B2 | 1/2019 | Puerini et al. | |
| 10,268,983 B2 | 4/2019 | Kumar et al. | |
| 2005/0043011 A1 | 2/2005 | Murray et al. | |
| 2006/0178891 A1 | 8/2006 | Kratzenberg | |
| 2008/0167118 A1 | 7/2008 | Kroeckel et al. | |
| 2010/0130164 A1 | 5/2010 | Chowdhury et al. | |
| 2012/0005023 A1 | 1/2012 | Graff | |
| 2015/0025969 A1 | 1/2015 | Schroll et al. | |
| 2015/0039458 A1* | 2/2015 | Reid | G06Q 20/206 705/26.1 |
| 2015/0088642 A1 | 3/2015 | Mathew | |
| 2017/0308942 A1* | 10/2017 | Landers, Jr. | G06Q 30/0635 |
| 2018/0005305 A1 | 1/2018 | Hirsch | |
| 2018/0146833 A1 | 5/2018 | Halloran et al. | |
| 2018/0232796 A1* | 8/2018 | Glaser | G06Q 30/0641 |
| 2019/0108396 A1 | 4/2019 | Dal Mutto et al. | |
| 2020/0302509 A1* | 9/2020 | Kishimoto | G06Q 30/0633 |

FOREIGN PATENT DOCUMENTS

| | | |
|---|---|---|
| CN | 110490697 | 11/2019 |
| TW | 200806035 | 1/2008 |
| TW | 201042566 | 12/2010 |
| TW | 201941141 | 10/2019 |
| TW | I675337 | 10/2019 |
| TW | 202006628 | 2/2020 |
| TW | I686748 | 3/2020 |

OTHER PUBLICATIONS

"Office Action of Taiwan Counterpart Application", dated Nov. 11, 2021, p. 1-p. 7.

* cited by examiner

INTELLIGENT STORE SYSTEM AND INTELLIGENT STORE METHOD

CROSS-REFERENCE TO RELATED APPLICATION

This application claims the priority benefit of Taiwan application no. 109138164, filed on Nov. 3, 2020. The entirety of the above-mentioned patent application is hereby incorporated by reference herein and made a part of this specification.

TECHNICAL FIELD

The disclosure relates to an intelligent store system and an intelligent store method.

BACKGROUND

In order to save labor costs, the related technologies of an intelligent store system are gradually being developed. In the existing intelligent store systems, identification on items and customers are unilaterally performed by the store system. When the identification is incorrect, there is no mechanism for correcting the error based on the customer's feedback. Based on this, an improved intelligent store system needs to be proposed.

SUMMARY

The disclosure provides an intelligent store system and an intelligent store method that can correct the incorrect identification that may occur in the intelligent store system.

The intelligent store system of the disclosure includes a proximity sensor, an image sensor, a human machine interface and a processor. The proximity sensor senses whether there is a first customer approaching the proximity sensor. The image sensor senses a movement trajectory of the first customer. The processor is coupled to the proximity sensor, the image sensor and the human machine interface. The processor determines whether the first customer is entering a store or leaving the store in response to the first customer approaching the proximity sensor sensed by the proximity sensor. If the processor determines that the first client is entering the store, the processor generates a first virtual identity and a first virtual shopping cart corresponding to the first virtual identity for the first customer, and updates a first product list of the first virtual shopping cart according to the movement trajectory. If the processor determines that the first customer is leaving the store, the human machine interface receives a first operation of the first customer, and the processor updates the first product list according to the first operation.

The intelligent store method of the disclosure includes: sensing, by a proximity sensor, whether there is a first customer approaching the proximity sensor; sensing, by an image sensor, a movement trajectory of the first customer; and determining whether the first customer is entering a store or leaving the store in response to the first customer approaching the proximity sensor sensed by the proximity sensor. If determining that the first client is entering the store, a first virtual identity and a first virtual shopping cart corresponding to the first virtual identity are generated for the first customer, and a first product list of the first virtual shopping cart is updated according to the movement trajectory. If determining that the first customer is leaving the store, a first operation of the first customer is received by a human machine interface, and the first product list according to the first operation is updated.

Based on the above, the intelligent store system disclosed in the disclosure can update the product list of the customer by the event record including the item and the probability corresponding to the item and the operation of the customer when leaving the store, so as to correct the incorrect identification that may occur in the intelligent store system.

To make the aforementioned more comprehensible, several embodiments accompanied with drawings are described in detail as follows.

DETAILED DESCRIPTION

Figure 1:
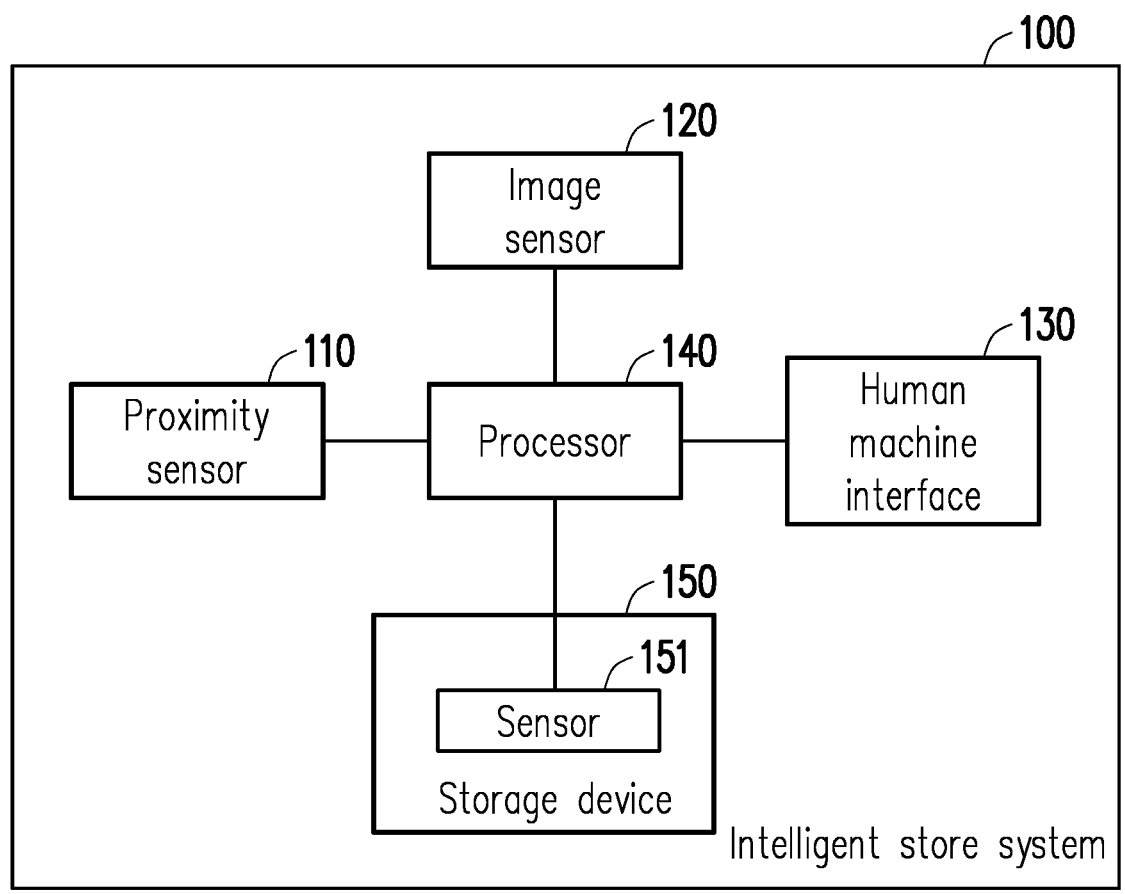
FIG. 1 is a schematic diagram illustrating an intelligent store system according to an embodiment of the disclosure.

FIG. 1 is a schematic diagram illustrating an intelligent store system 100 according to an embodiment of the disclosure. The intelligent store system 100 includes a proximity sensor 110, an image sensor 120, a human machine interface 130 and a processor 140.

The proximity sensor 110 is a sensor capable of detecting whether there is an object nearby. The proximity sensor 110 may be set at the entrance and exit of the intelligent store system 100. The proximity sensor 110 can sense whether there is a first customer approaching the proximity sensor 110.

The image sensor 120 may be a camera or a monitoring device. The image sensor 120 may sense a movement trajectory of the first customer, such as a movement route, a direction, and a time of the first customer in a store, so as to generate the movement trajectory of the first customer, but the disclosure is not limited thereto. For instance, the movement trajectory may be "the first customer stays in front of an item A for two minutes".

The human machine interface 130 may be installed on the intelligent store system 100. The human machine interface 130 is, for example, a touch panel, but the disclosure is not limited thereto. The man-machine interface 130 may be used to display a graphical user interface (GUI), and may be used to receive customer operations and output information for customer reference. In an embodiment, the human machine interface 130 may be a touch panel on a handheld electronic device used by the first customer (e.g., a smart phone, a tablet computer or a personal computer), but the disclosure is not limited thereto. For instance, the handheld electronic device used of the first customer is communicatively connected with the intelligent store system 100. The processor 140 of the intelligent store system 100 may use a display of the handheld electronic device as the human machine interface 130 for displaying the graphical user interface.

The processor 140 is, for example, a central processing unit (CPU) or other programmable micro control units (MCU) for general purpose or special purpose, a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA) or other similar elements or a combination of above-mentioned elements. The processor 140 may be coupled to the proximity sensor 110, the image sensor 120 and the human machine interface 130. The processor 140 may include a storage medium for storing data.

Before entering the store, the first customer may re-register a first customer identity with the intelligent store system 100. For example, the first customer identity may be a personal documentation or a personal image of the first customer. The pre-registered first customer identity may be stored in the storage medium of the processor 140 of the intelligent store system 100.

In response to the first customer approaching the proximity sensor 110 sensed by the proximity sensor 110, the processor 140 may determine whether the first customer is entering the store or leaving the store. For instance, the processor 140 may generate a virtual identity for the customer entering the store. Accordingly, if the customer approaching the proximity sensor 110 does not have the virtual identity, the processor 140 may determine that the customer is entering the store. If the customer approaching the proximity sensor 110 already has the virtual identity, the processor 140 may determine that the customer is leaving the store.

If the processor 140 determines that the first customer is entering the store, the processor 140 may generate a first virtual identity for the first customer. The processor 140 may generate the first virtual identity for the first customer according to the first customer identity pre-registered by the first customer. In an embodiment, the processor 140 may identify the first customer according to an image sensed by the image sensor 120, so as to generate the first virtual identity for the first customer. In an embodiment, the processor 140 may sense the image of the first customer by the image sensor 120, and accordingly re-register the first customer identity for the first customer according to the image of the first customer.

The processor 140 may also generate a first virtual shopping cart corresponding to the first virtual identity for the first customer, and update a first product list of the first virtual shopping cart according to the movement trajectory of the first customer sensed by the image sensor 120. For instance, if the movement trajectory is "the first customer stays in front of the item A for two minutes", the processor 140 may add the item A to the first product list of the first virtual shopping cart corresponding to the first virtual identity, so as to update the first product list.

The intelligent store system 100 may also include a storage device 150. The storage device 150 may include a sensor 151 coupled to the processor 140. The sensor 151 may be an infrared sensor or a weight sensor, but the type of the sensor 150 is not limited by the disclosure.

The processor 140 may sense an item picked up from the storage device 150 by the first customer by using the sensor 151 so as to generate an event record corresponding to the first virtual identity. For instance, if the sensor 151 senses that the item A is picked up from the storage device 150 by the first customer, the processor 140 may generate the event record "the item A is picked up from the storage device 150 by a person corresponding to the first virtual identity". According to the event record "the item A is picked up from the storage device 150 by the person corresponding to the first virtual identity" and the movement trajectory "the first customer stays in front of the item A for two minutes", the processor 140 may add the item A to the first product list of the first virtual shopping cart corresponding to the first virtual identity, so as to update the first product list.

In another embodiment, if the sensor 151 senses that an item B is put back to the storage device 150 by the first customer, the processor 140 may generate the event record "the item B is put back to the storage device 150 by the person corresponding to the first virtual identity". According to the event record "the item B is put back to the storage device 150 by the person corresponding to the first virtual identity" and the movement trajectory "the first customer stays in front of the shelf of item B for two minutes", the processor 140 may remove the item B from the first product list of the first virtual shopping cart corresponding to the first virtual identity, so as to update the first product list.

In an embodiment, the image sensor 120 may sense the movement trajectory for multiple customers, and the movement trajectory may include a distance between the customer and the item (e.g., the item A). The processor 140 may set up a distance threshold. If the distance between the customer and the item A is greater than the distance threshold when the event record "the item A is picked up from the storage device 150 by the person corresponding to the first virtual identity" is generated (i.e., the sensor 151 is triggered), the processor 140 may determine that the customer has low probability of picking up the item A. If the distance between the customer and the item A is less than or equal to the distance threshold when the event record is generated, the processor 140 may determine that the customer has high probability of picking up the item A. When there are multiple customers who may pick up the item A, the processor 140 may determine that the customer closer to the item A has a higher probability of picking up the item A according to the movement trajectory, and the customer farther from the item A has a lower probability of picking up the item A according to the movement trajectory.

For instance, it is assumed that when the event record "the item A is picked up from the storage device 150" is generated, the movement trajectory generated by the image sensor 120 contains information regarding "the first customer stays in front of the item A for two minutes and the distance between the first customer and the item A is 40 cm; the second customer stays in front of the item A for two minutes and the distance between the second customer and the item A is 60 cm; the third customer stays in front of the item A for two minutes and the distance between the third customer and the item A is 80 cm". The processor 140 may determine that the distance between the third customer and the item A (i.e., 80 cm) is greater than the distance threshold value according to the movement trajectory. Accordingly, the processor 140 may determine that the third customer does not pick up the item A. On the other hand, according to the movement trajectory, the processor 140 may determine that the distance between the first customer and the item A and the distance between the second customer and the item A are both less than or equal to the distance threshold, and the distance between the first customer and the item A is less than the distance between the second customer and the item A. Accordingly, the processor 140 may determine that the first customer has the higher probability of picking up the item A, and the second customer has the lower probability of picking up the item A. Therefore, according to the event record "the item A is picked up from the storage device 150" and the movement trajectory "the first customer stays in front of the item A for two minutes and the distance between the first customer and the item A is 40 cm; the second customer stays in front of the item A for two minutes and the distance between the second customer and the item A is 60 cm; the third customer stays in front of the item A for two minutes and the distance between the third customer and the item A is 80 cm", the processor 140 may add the item A to the first product list of the first virtual shopping cart corresponding to the first virtual identity (i.e., the virtual identity of the first customer), so as to update the first product list.

The storage device 150 may store a first item and a second item. The event record may include the first item, a first probability corresponding to the first item, the second item and a second probability corresponding to the second item. Since the storage device 150 can store multiple items, the processor 140 may not be able to accurately determine which item is picked up from the storage device 150. Therefore, the event record may record multiple probabilities corresponding to multiple items. For instance, the first probability corresponding to the first item may represent a probability of the item picked up from the storage device 150 being the first item, and the second probability corresponding to the first item may represent a probability of the item picked up from the storage device 150 being the second item.

Table 1 is an example of the event record. Table 2 is an example of the product list. Referring to Table 1 and Table 2, it is assumed that the storage device 150 stores an item B1 and an item B2. The processor 140 may detect that the first customer stayed in front of the storage device 150 by the image sensor 120, and generate the movement trajectory "the first customer stayed in front of the storage device 150 for two minutes". The processor 140 may sense that the item in the storage device 150 is picked up by the first customer corresponding to the first virtual identity by using the sensor 151, and accordingly generate the event record with the corresponding number 1. The event record with the number 1 may record "the probability of the item picked up from the storage device 150 by the person corresponding to the first virtual identity being the item B1 is 70% and the probability of the item picked up from the storage device 150 by the person corresponding to the first virtual identity being the item B2 is 30%". According to the event record with the number 1 and the movement trajectory "the first customer stays in front of the item A for two minutes", the processor 140 may add the item B1 corresponding to the higher probability among the item B1 and the item B2 to the first product list of the first virtual shopping cart corresponding to the first virtual identity, so as to update the first product list.

TABLE 1

| Event record number | Picked up/put back | The item (and the probability corresponding to the Item) | Corresponding virtual identity |
|---|---|---|---|
| 1 | Picked up | B1 (probability 70%) B2 (probability 30%) | The first virtual identity |

TABLE 2

| Corresponding virtual identity | Product list of virtual shopping cart corresponding to virtual identity |
|---|---|
| The first virtual identity | The first product list: the item B1 |

Figure 2:
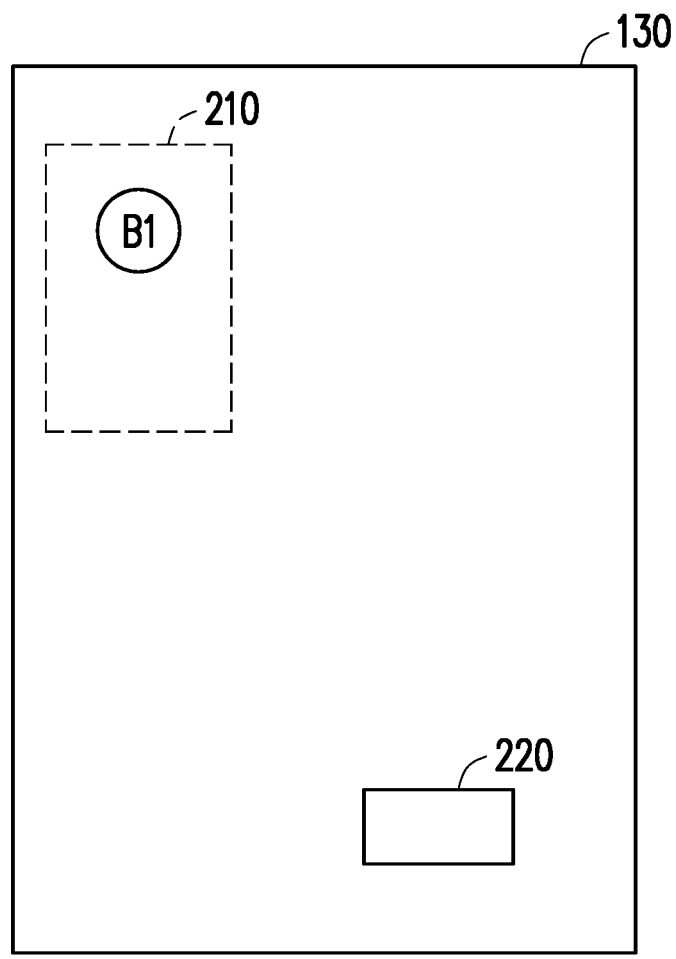
FIG. 2 is a schematic diagram illustrating the human machine interface according to an embodiment of the disclosure.

If the processor 140 determines that the first customer is leaving the store, the human machine interface 130 may receive an operation of the first customer, and the processor 140 may update the first product list according to the operation. FIG. 2 is a schematic diagram illustrating the human machine interface 130 according to an embodiment of the disclosure. The human machine interface 130 may include a button 220 and may display a first product list 210 corresponding to the first customer (or the first virtual identity). In an embodiment, because the first probability (70%) corresponding to the first item (the item B1) is greater than the second probability (30%) corresponding to the second item (the item B2), the processor 140 may display the first product list 210 including the first item (i.e., the item B1) by the human machine interface 130 in response to the first probability greater than the second probability. In other words, if the processor 140 determines that the item picked up from the storage device 150 by the first customer may be one of the first item (the item B1) and the second item (the item B2), the processor 140 may display the first item (the item B1) corresponding to the higher probability by the human machine interface 130, so as to prompt the first customer that the item she/he took may be the first item (the item B1). In an embodiment, the first customer may confirm the item B1 added to the first product list through the button 220.

In an embodiment, in response to the event including the first probability (70%) corresponding to to first item (i.e., the item B1) and the second probability (30%) corresponding to the second item (i.e., the item B2), the processor 140 may display the first product list 210 including the first item and the second item by the human machine interface 130 for the customer to select one of the first item and the second item.

The first customer may remove the first item (the item B1) from the first product list 210 through an operation. For instance, if the first customer finds that the item B1 in the first product list is not the item to be checked out, the operation of the first customer may be "selecting the item B1 of the first product list 210, and removing the item B1 by dragging the item B1 towards a border of the human machine interface 130". As another example, the operation of the first customer may be "removing the item B1 by clicking on the item B1 of the first product list 210", but the disclosure is not limited thereto. The processor 140 may remove the first item (the item B1) from the first product list according to a first operation of the first customer.

Table 3 below is another example of continuation of the event record shown in Table 1, and Table 4 below is another example of continuation of the product list shown in Table 2. In response to the first item (the item B1) removed from the first product list 210, the processor 140 may add the second item (the item B2) to the first product list 210 according to the event record with the number 1 "the probability of the item picked up from the storage device 150 by the person corresponding to the first virtual identity being the item B1 is 70%, and the probability of the item picked up from the storage device 150 by the person corresponding to the first virtual identity being the item B2 is 30%". The processor 140 may also modify the event record with the number 1 to "the probability of the item picked up from the storage device 150 by the first virtual identity being the item B2 is 100%". In an embodiment, in response to the first item (the item B1) removed from the first product list 210, the processor 140 may display multiple items including the second item (the item B2) corresponding to the first virtual identity by the human machine interface 130 for the first customer to select. If the first customer select the second item (the item B2) from the items, the processor 140 may add the second item (the item B2) to the first product list 210 in response to the operation of the first customer received by the human machine interface 130. The processor 140 may also modify the event record with the number 1 to "the probability of the item picked up from the storage device 150 by the first virtual identity being the item B2 is 100%".

TABLE 3

| Event record number | Picked up/put back | The item (and the probability corresponding to the Item) | Corresponding virtual identity |
|---|---|---|---|
| 1 | Picked up | B2 (probability 100%) | The first virtual identity |

TABLE 4

| Corresponding virtual identity | Product list of virtual shopping cart corresponding to virtual identity |
|---|---|
| The first virtual identity | The first product list: the item B2 |

Figure 3:
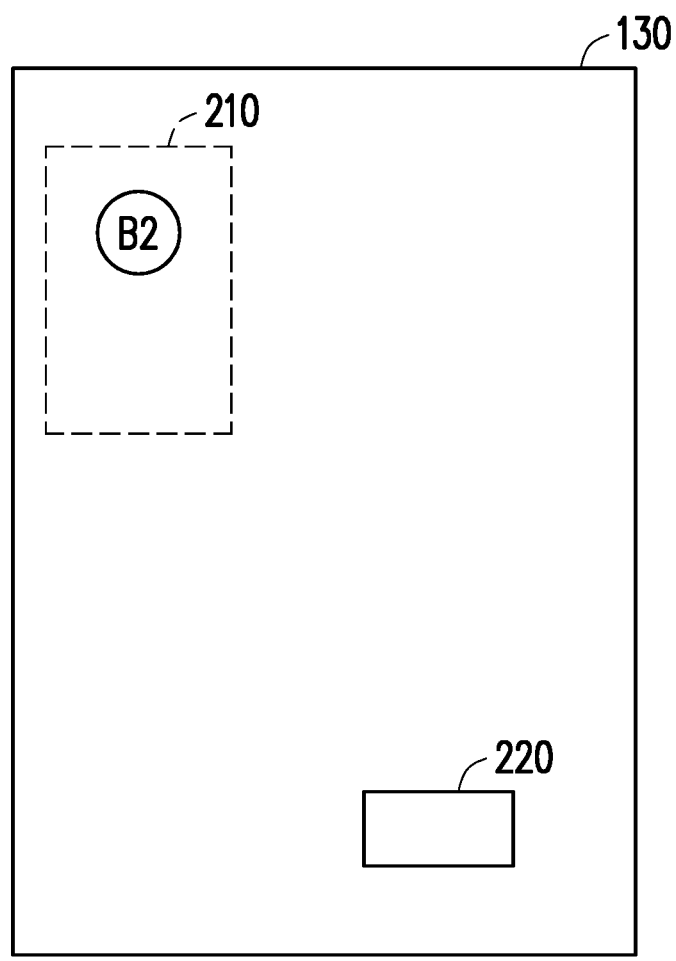
FIG. 3 is another schematic diagram illustrating the human machine interface according to an embodiment of the disclosure.

FIG. 3 is another schematic diagram illustrating the human machine interface 130 according to an embodiment of the disclosure. The human machine interface 130 may display the first product list 210 and the button 220. In response to the first item B1 removed from the first product list 210, the processor 140 may display the item B2 by the human machine interface 130 according to the event record with the number 1 "the probability of the item picked up from the storage device 150 by the first virtual identity being the item B2 is 100%". The human machine interface 130 may receive an operation of the first customer. The operation of the first customer may be "pressing the button 220". The operation may be used to confirm that the item B2 is the item picked up from the storage device 150 by the first customer (the first virtual identity). The processor 140 may add the item B2 to the first product list 210 according to the operation.

In another embodiment, the processor 140 may add the item to the first product list according to the operation. For instance, it is assumed that the first product list includes the item B2. If the first customer wishes to add the item B1 to the first product list, the first operation of the first customer may "pressing the button 220, and selecting the item B1 to be added". The processor 140 may add the item B1 to the first product list according to the first operation. In an embodiment, the item that may be added to the first product list by the first customer relates to the event record. For instance, if the event record includes information regarding the item B1 and the probability of the item B1, the processor 140 may display the item B1 by the human machine interface 130 for the customer to select.

After the first customer adds the item to be purchased to the first product list, the first customer may use the human machine interface 130 to check out the first product list. For example, the human machine interface 130 may include another button, so that the first customer may press that button when she/he wants to check out.

Table 5 is another example of the event records, and Table 6 is another example of the product list. Referring to Table 5 and Table 6, the event record may be associated with the first virtual identity corresponding to the first customer and a second virtual identity corresponding to a second customer. Here, a second virtual shopping cart corresponds to the second virtual identity, and the second virtual shopping cart includes a second product list.

For example, an event record with a number 2 may be "a probability of an item C being the item picked up from the storage device 150 by the person corresponding to the first virtual identity is 60%, a probability of the item C being the item picked up from the storage device 150 by a person corresponding to the second virtual identity is 40%". In the example of the event record shown in Table 5, according to the event record with the number 2, the movement trajectory "the first customer stays in front of the item C for two minutes and the distance between the first customer and the item C is 40 cm" and the movement trajectory "the second customer stays in front of the item C for two minutes and the distance between the second customer and the item C is 60 cm", the processor 140 may have the item C associated with the first product list of the first virtual shopping cart corresponding to the first virtual identity and the second product list of the second virtual shopping cart corresponding to the second virtual identity. Since the probability of the item C picked up by the first customer is greater than the probability of the item C picked up by the second customer, the processor 140 may first add the item C to the first product list 210 of the first customer. In an embodiment, based on the distance between the first customer and the item C being less than the distance between the second customer and the item C, the processor 140 may determine that the probability corresponding to the first customer or the first virtual identity is higher and the probability corresponding to the second customer or the second virtual identity is lower. The processor 140 may calculate the probabilities above according to the distance between the first customer and the item C and/or the distance between the second customer and the item C.

TABLE 5

| Event record number | Picked up/put back | Item | The probability corresponding to the first virtual identity | The probability corresponding to the second virtual identity |
|---|---|---|---|---|
| 2 | Picked up | C | The probability 60% | The probability 40% |

TABLE 6

| The virtual identity | Product list of virtual shopping cart corresponding to virtual identity |
|---|---|
| The first virtual identity | The first product list: the item C |
| The second virtual identity | The second product list: No item |

As shown in Table 6, the first product list 210 may include the item C, and the second product list may not include the item C. The first customer may remove the item from the first product list 210 through an operation. For example, if the first customer finds that the item C is not the item to be checked out, the operation of the first customer may be "selecting the item C of the first product list 210, and removing the item C by dragging the item C towards a border of the human machine interface 130".

Table 7 is another example of the event records, and Table 8 is another example of the product list. Referring to Table 7 and Table 8, In response to the item removed from the first product list 210, the processor 140 may add the item to the second product list of the second virtual shopping cart corresponding to the second virtual identity according to the event record including the information of the second virtual identity (e.g., the probability at which the item removed from the first product list 210 is picked up from the storage device 150 by the second virtual identity). For instance, after the processor 140 determines that the item C is not picked up by the first customer, the processor 140 may determine that the customer who picks up the item C from the storage device 150 is the second customer according to the event record "the probability of the item C picked up from the storage device 150 by the first virtual identity is 60%, and the probability of the item C picked up from the storage device 150 by the second virtual identity is 40%", and add the item C to the second product list of the second virtual shopping cart corresponding to the second virtual identity. The processor 140 may also modify the event record with the number 2 to "the probability of the item C picked up from the storage device 150 by the second virtual identity is 100%".

TABLE 7 an example of the event record

| Event record number | Picked up/put back | Item | The probability corresponding to the first virtual identity | The probability corresponding to the second virtual identity |
| --- | --- | --- | --- | --- |
| 2 | Picked up | C (probability 100%) | | The probability 100% |

TABLE 8 an example of the product list

| The virtual identity | Product list of virtual shopping cart corresponding to virtual identity |
| --- | --- |
| The first virtual identity | The first product list: No item |
| The second virtual identity | The second product list: the item C |

In another embodiment, the image sensor 120 may sense the movement trajectory for the first customer and the second customer. The movement trajectory may include a distance between the first customer and the item and a distance between the second customer and the item. The event record may include a probability of the item corresponding to the first customer (or the first virtual identity) and a probability of the item corresponding to the second customer (or the second virtual identity). The probabilities recorded by the event record are, for example, generated by the processor 140 according to the distance between the customer and the item in the movement trajectory. For example, the movement trajectory may be "the first customer stays in front of the item C for two minutes and the distance between the first customer and the item C is 40 cm, and the second customer stays in front of the item C for two minutes and the distance between the second customer and the item C is 60 cm". Since a distance ratio of the distance between the first customer and the item C (40 cm) and the distance between the second customer and the item C (60 cm) is 40:60, the processor 140 may generate the event record "the probability of the item C picked up from the storage device 150 by the first virtual identity is 60%, and the probability of the item C picked up from the storage device 150 by the second virtual identity is 40%" according to the distance ratio.

Figure 4:
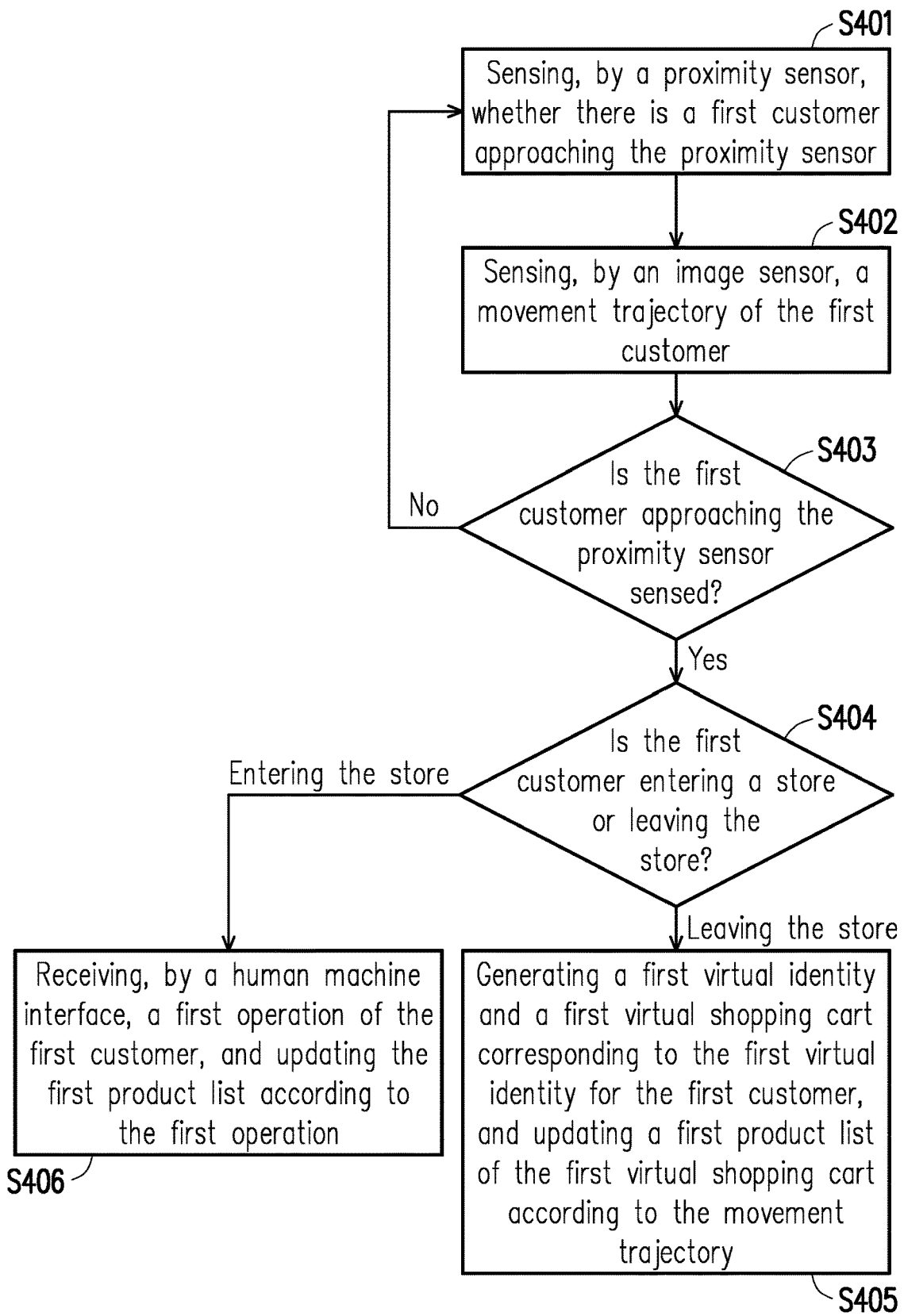
FIG. 4 is a flowchart illustrating an intelligent store method according to an embodiment of the disclosure.

FIG. 4 is a flowchart illustrating an intelligent store method 400 according to an embodiment of the disclosure. The intelligent store method 400 may be implemented by the intelligent store system 100 of FIG. 1, for example. In step S401, whether there is a first customer approaching the proximity sensor is sensed by a proximity sensor. In step S402, a movement trajectory of the first customer is sensed by an image sensor. In step S403, whether the first customer approaching the proximity sensor is sensed is determined. If the first customer approaching the proximity sensor is sensed, step S404 is executed. If the first customer approaching the proximity sensor is not sensed, step S401 is executed. In step S404, whether the first customer is entering a store or leaving the store is determined. If determining that the first client is entering the store, in step S405, a first virtual identity and a first virtual shopping cart corresponding to the first virtual identity are generated for the first customer, and a first product list of the first virtual shopping cart is updated according to the movement trajectory. If determining that the first customer is leaving the store, in step S406, a first operation of the first customer is received by a human machine interface, and the first product list according to the first operation is updated.

In summary, the intelligent store system disclosed in the disclosure may update the product list of the customer by the event record including the item and the probability corresponding to the item and the operation of the customer when leaving the store. On the other hand, the operation of a specific customer leaving the store may also be used to update product lists of other customers. In this way, the incorrect identification that may occur in the intelligent store system may be effectively corrected.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

The invention claimed is:
1. An intelligent store system, comprising:
a proximity sensor, configured to sense a first customer approaching the proximity sensor to generate a sensed data;
an image sensor, configured to sense a movement trajectory and an image of the first customer;
a storage device, comprising a sensor, wherein the storage device is configured to store a first item and a second item
a human machine interface; and
a processor, coupled to the sensor, the proximity sensor, the image sensor and the human machine interface, wherein the processor is configured to:
determine whether the first customer in the image is associated with a stored virtual identity in response to the sensed data being generated, wherein
in response to determining the first customer being not associated with the stored virtual identity, generate a first virtual identity and assigns the first virtual identity to the first customer, sense an item picked up from the storage device by the sensor to generate an event record corresponding to the first virtual identity, and update a first list according to the event record and the movement trajectory, wherein the event record records the first item, a first probability of the first item, the second item, and a second probability of the second item, wherein display a third item in a second list corresponding to the first customer by the human machine interface in response to a third probability included in the second list being greater than a fourth probability included in the second list, remove the third item from the second list according to a first touch operation received by the human machine interface to update the second list, add a fourth item to the second list according to a second event record corresponding to the stored virtual identity in response to the third item being removed from the second list, and output the updated second list to a checkout system, wherein the third probability corresponds to the third item included in the second list and the fourth probability corresponds to the fourth item included in the second list.

2. The intelligent store system of claim 1, wherein the processor configured to display the fourth item by the human machine interface according to the second event record in response to the third item being removed from the second list.

3. The intelligent store system of claim 1, wherein the second event record is associated with the stored virtual identity corresponding to the first customer and a second virtual identity corresponding to a second customer, wherein the processor configured to add the third item to a third list corresponding to the second virtual identity according to the second event record in response to the third item being removed from the second list.

4. The intelligent store system of claim 1, wherein the processor configured to add an item to the second list according to the first touch operation.

5. The intelligent store system of claim 1, wherein the processor configured to generate the first virtual identity for the first customer according to a first customer identity pre-registered by the first customer.

6. The intelligent store system of claim 5, wherein the image sensor senses a historical image of the first customer, so as to pre-register the first customer identity according to the historical image.

7. An intelligent store method, comprising:
sensing, by a proximity sensor, a first customer approaching the proximity sensor to generate a sensed data;
sensing, by an image sensor, a movement trajectory and an image of the first customer; and
determining whether the first customer in the image is associated with a stored virtual identity in response to the sensed data being generated, wherein
in response to determining the first customer being not associated with the stored virtual identity, generating a first virtual identity and assigning the first virtual identity to the first customer, sensing an item picked up from a storage device by a sensor in the storage device to generate an event record corresponding to the first virtual identity, and updating a first list according to the event record and the movement trajectory, wherein the event record records a first item stored in the storage device, a first probability of the first item, a second item stored in the storage device, and a second probability of the second item, wherein displaying a third item in a second list corresponding to the first customer by a human machine interface in response to a third probability included in the second list being greater than a fourth probability included in the second list, removing the third item from the second list according to a first touch operation received by the human machine interface to update the second list, adding a fourth item to the second list according to a second event record corresponding to the stored virtual identity in response to the third item being removed from the second list, and outputting the updated second list to a checkout system, wherein the third probability corresponds to the third item included in the second list and the fourth probability corresponds to the fourth item included in the second list.

8. The intelligent store method of claim 7, wherein the step of updating the first list comprises:
displaying the fourth item by the human machine interface according to the second event record in response to the third item being removed from the second list.

9. The intelligent store method of claim 7, wherein the second event record is associated with the stored virtual identity corresponding to the first customer and a second virtual identity corresponding to a second customer, wherein the intelligent store method further comprises:
adding the third item to a third list corresponding to the second virtual identity according to the second event record in response to the third item being removed from the second list.

10. The intelligent store method of claim 7, wherein the step of updating the first list comprises:
adding an item to the second list according to the first touch operation.

11. The intelligent store method of claim 7, wherein the step of generating the first virtual identity and assigning the first virtual identity to the first customer comprises:
generating the first virtual identity for the first customer according to a first customer identity pre-registered by the first customer.

12. The intelligent store method of claim 11, wherein the step of generating the first virtual identity for the first customer according to the first customer identity pre-registered by the first customer comprises:
sensing a historical image of the first customer by the image sensor; and
pre-registering the first customer identity according to the historical image.

* * * * *